United States Patent [19]

Dahlke

[11] 4,205,327

[45] May 27, 1980

[54] TWO WIRE CURRENT TRANSMITTER WITH ADJUSTABLE CURRENT CONTROL LINEARIZATION

[75] Inventor: Charles J. Dahlke, New Germany, Minn.

[73] Assignee: Rosemount Inc., Eden Prairie, Minn.

[21] Appl. No.: 886,095

[22] Filed: Mar. 13, 1978

[51] Int. Cl.² .................... G08C 19/04; G01K 7/24
[52] U.S. Cl. ............................ 340/208; 73/362 AR; 323/69; 323/75 H; 323/75 N; 324/DIG. 1; 340/186; 340/210
[58] Field of Search ............... 340/208, 186, 187, 210; 73/362 AR; 323/75 H, 75 N, 68, 69, 40; 361/1; 363/74; 324/DIG. 1

[56] References Cited

U.S. PATENT DOCUMENTS

| | | | |
|---|---|---|---|
| 3,562,729 | 2/1971 | Hurd | 340/210 |
| 3,573,599 | 4/1971 | Rose | 361/1 |
| 3,680,384 | 8/1972 | Grindheim | 340/186 |
| 3,754,442 | 8/1973 | Arnett | 323/75 H |
| 3,764,880 | 10/1973 | Rose | 73/362 AR |
| 3,887,864 | 6/1975 | Knudsen | 340/186 |
| 3,898,554 | 8/1975 | Knudsen | 340/186 |
| 3,975,719 | 8/1976 | Frick | 340/210 |
| 4,016,763 | 4/1977 | Grindheim | 340/210 |

Primary Examiner—John W. Caldwell, Sr.
Assistant Examiner—James J. Groody
Attorney, Agent, or Firm—Kinney, Lange, Braddock, Westman and Fairbairn

[57] ABSTRACT

A two wire current transmitter for controlling the total current in the two wires in accordance with a value of a parameter to be sensed, which provides for substantial linearization of the electrical characteristic representative of the value of the parameter to be sensed by adjusting the current from an adjustable current control to substantially compensate for the nonlinear relationship of the parameter to be sensed versus the electrical output of the sensor of said parameter. The circuit also provides for substantial compensation for sensor lead wire effects.

22 Claims, 2 Drawing Figures

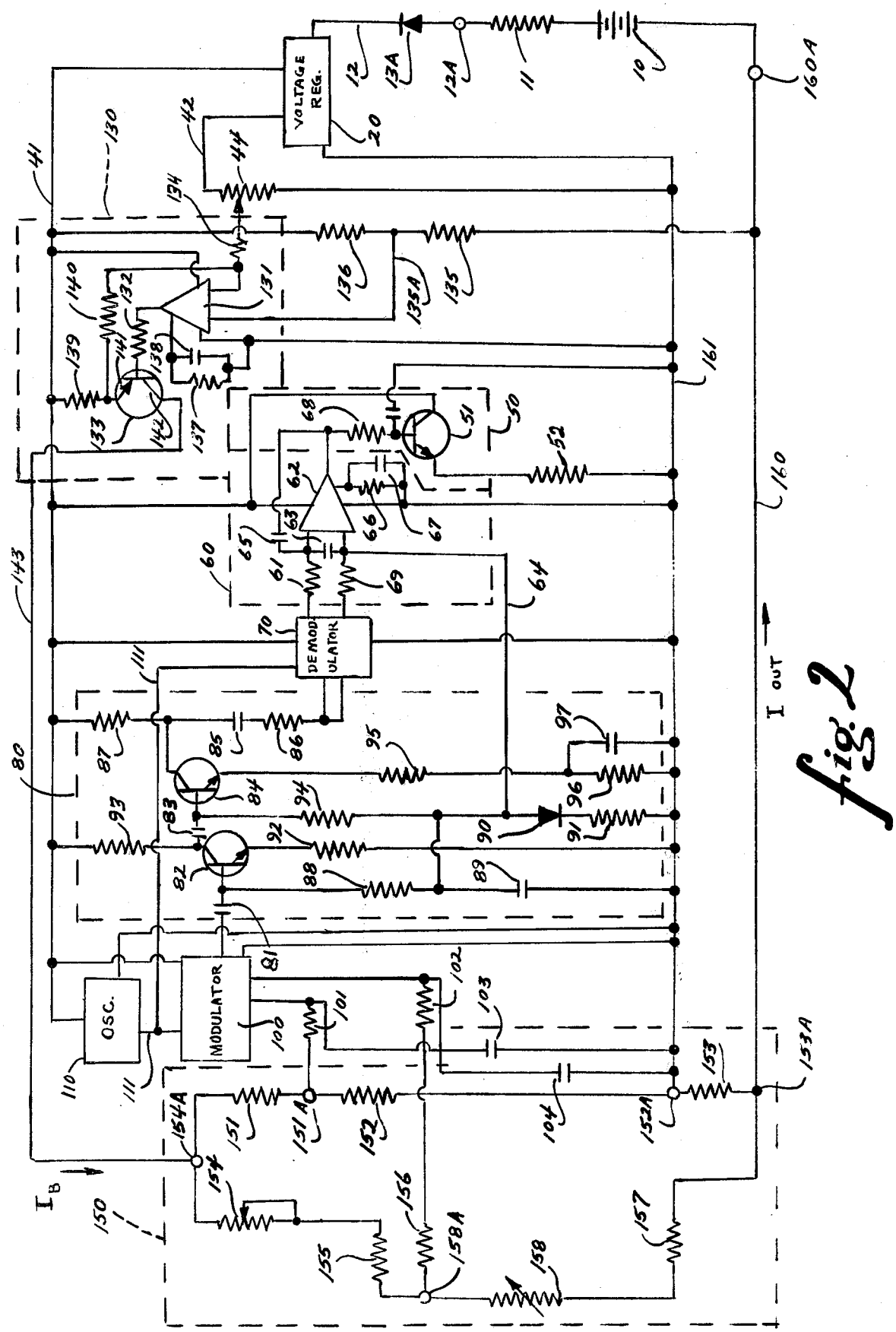

TWO WIRE CURRENT TRANSMITTER WITH ADJUSTABLE CURRENT CONTROL LINEARIZATION

BACKGROUND OF THE INVENTION

1. Field of the Invention

The invention relates to a two wire current transmitter where a DC current is controlled by a transmitter to correspond with the magnitude of a value of a parameter to be sensed by a sensing element which may be a temperature sensitive resistor.

2. Prior Art

Two wire current controllers for various sensors and transducers have been developed. A temperature sensor control arrangement is disclosed in U.S. Pat. No. 3,680,384, issued Aug. 1, 1972 which also discloses thermocouple and millivolt inputs. U.S. Pat. No. 3,573,599, issued Apr. 6, 1971 illustrates an isolated circuit using a voltage regulator, and U.S. Pat. No. 3,562,729, issued Feb. 9, 1971 discloses another two wire circuit for temperature sensing.

SUMMARY OF THE INVENTION

The present invention provides for a two wire transmitter wherein the two wire transmitter circuit output is corrected for nonlinearity of the sensor, which may be a temperature sensitive resistor. For example, the resistance vs. temperature curve for a platinum resistive element, which is nonlinear, may be compensated by employing a non-linear sensor network to adjust a current source used to excite a bridge in which the sensor is connected, as a function of the sensed variable. The adjusted current offsets the output signals from the bridge to compensate for the sensor nonlinearity.

The present invention also provides the ability of the two wire transmitter to interface with three lead wires to the sensor, which may be a platinum resistive element, wherein the effect of the resistance of the lead wires is substantially compensated for.

BRIEF DESCRIPTION OF THE DRAWINGS

FIG. 2 is a detailed schematic representation of the transmitter embodiment.

DESCRIPTION OF THE PREFERRED EMBODIMENT

Figure 1:
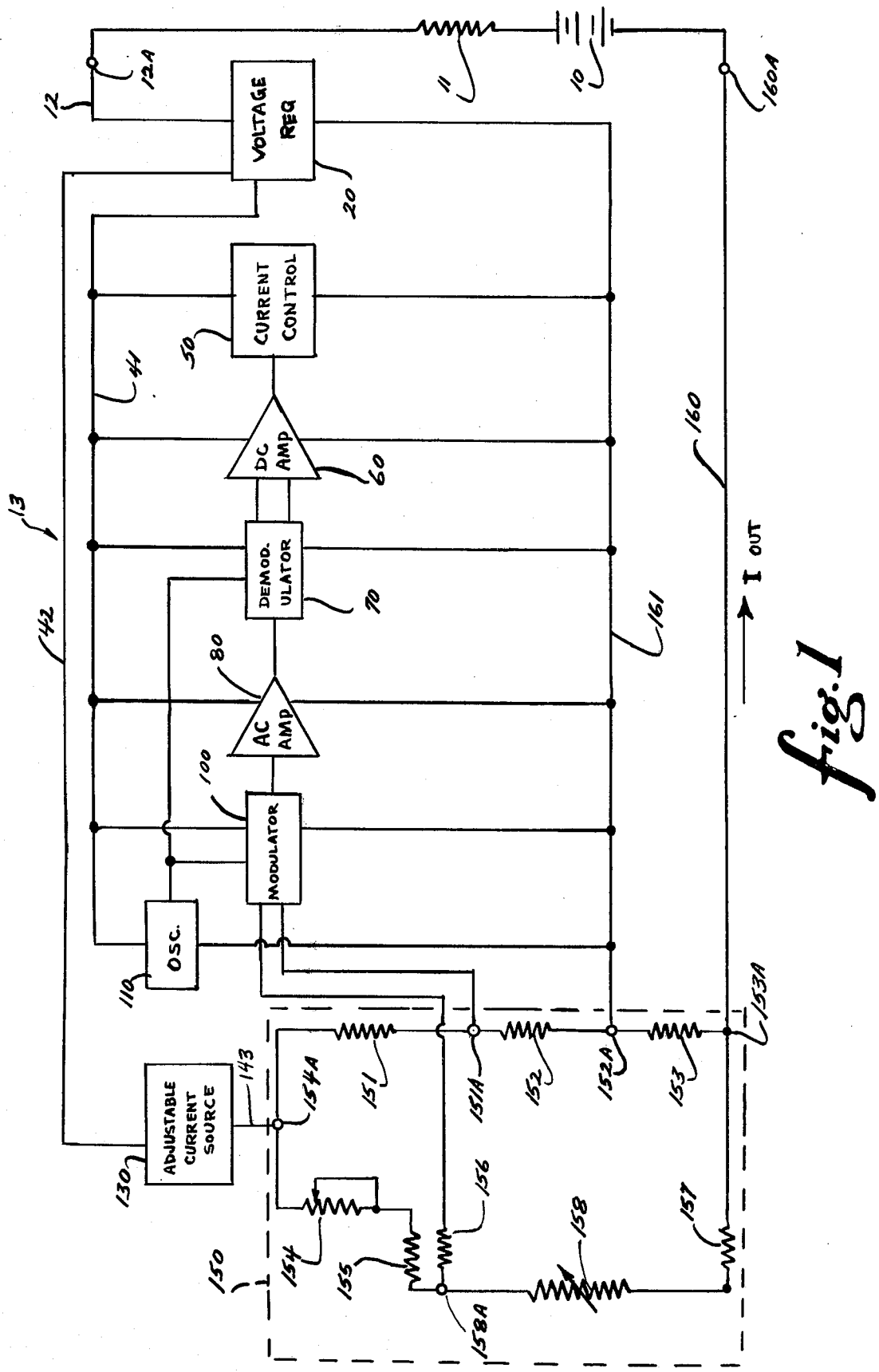
FIG. 1 is a block diagram representation of the transmitter of the present invention in a nonisolated embodiment.

Referring to FIG. 1, a DC power supply 10 and a series load resistor 11 both of which may be remotely located, are series connected to the transducer circuit 13 by lines 12 and 160 by connection to terminals 12A and 160A. Transducer circuit 13 comprises a voltage regulator 20, which provides power to various components including a sensor network 150, which may be a resistance bridge. The bridge provides an output current as a function of the resistance of one or more of the bridge arms. An adjustable current source 130 powered from regulator 20 provides current to the sensor network 150. Voltage regulator 20 is connected to provide a stable voltage for the transducer circuit through lines 41 and 161.

Sensor network 150 comprises a variable resistor 154 which is connected to the output of the adjustable current source 130 at a sensor network input junction 154A. A variable (adjustable) resistor 154 is connected to a resistive sensor 158 at junction 158A. The connection to junction 158A is through a resistance represented at 155. Sensor network 150 also includes a resistor 151 which has one end connected to the output of the adjustable current source 130 at junction 154A and in a parallel relationship with adjustable resistor 154. The other end of resistor 151 is connected to a resistor 152. A first input of modulator 100 is connected at a network output junction 151A between resistors 151 and 152. Resistor 152 is connected at its second end to a resistor 153 which in turn is connected through a resistance represented at 157 to the second end of sensor resistor 158. Line 161 connects at a network input junction 152A between resistors 152 and 153, as shown, and line 160 connects to the second end of resistor 153 at a current return junction 153A.

The second input of the modulator 100 is connected to the sensor network 150 through a resistance represented at 156 at an output terminal 158A, as shown between resistance 155 and sensor resistor 158. Line 160 is connected to DC power supply 10 through terminal 160A thus completing the circuit.

The resistances 155, 156 and 157 are representations of the resistances of conductors or lines that connect sensor resistor 158 to sensor network 150 and to the second input of modulator 100. Sensing resistor 158 can be located remotely from sensor network 150 and from modulator 100.

Modulator 100, an AC amplifier 80, a demodulator 70, a DC amplifier 60, a current control 50, and an oscillator 110 are connected to line 41 and to line 161 and which in turn receive power solely through terminals 12A and 160A from source 10. The output of oscillator 110 is also connected to the respective control inputs of the modulator 100 and to the demodulator 70. The output of modulator 100 is connected to the input of AC amplifier 80 whose output is connected to the input of demodulator 70. The output terminals of demodulator 70 in turn are connected to the respective differential inputs of DC amplifier 60 which in turn has its output connected to provide a signal to the current control 50.

In operation voltage regulator 20 is connected to source 10 through line 12, line 161, resistor 153 and line 160. A stable voltage is provided by regulator 20 to adjustable current source 130 which provides current for the sensor network 150 along line 143 to junction 154A. A change in the condition being measured by sensor 158, which may be temperature, causes a change in the signal in sensor network 150; for example, a voltage or resistance change. The change in the signal in sensor network 150 is representative of the condition to be measured. This results in an unbalance in the electrical signals at the output junctions 151A and 158A of sensor network 150, which unbalance is sensed at the inputs of modulator 100. Modulator 100 converts the unbalance, which is a direct current signal, to an alternating current output error signal representative of the differential between the signals at junctions 151A and 158A. AC amplifier 80 amplifies this output signal representing the unbalance, and it is then demodulated by demodulator 70.

The error signal is then sensed at an input of DC amplifier 60 where the magnitude of the error signal with respect to a reference input is amplified as a DC signal and then sent to the current control 50 which outputs a current correction signal as a function of the signal at its input. Thus the current signal is representative of the condition or parameter being sensed.

Substantially all of the current signal from current control 50 flows through line 161 and resistor 153 to line 160 and then through DC power supply 10 and load resistor 11. The current flowing through resistor 153 provides a skewing voltage to rebalance sensor network 150. The skewing voltage produced by resistor 153 restores the signals at junctions 151A and 158A to a desired relationship. The span of sensor network 150 is adjusted by varying the current delivered to the network by adjustable current source 130. The linearity correction achieved through adjustable current source 130 is described below.

Referring to FIG. 2, wherein the circuit elements are numbered consistently with FIG. 1, a diode 13A is connected at its anode to line 12 and at its cathode to the input of voltage regulator 20. Voltage regulator 20 may be of a design well known to those skilled in the art or it may be of a design similar to that in my co-pending application Ser. No. 886,096, filed on even date herewith and entitled Two Wire Transmitter With Improved Voltage Regulator. The output of voltage regulator 20 is connected by line 41 and line 161 to the subsequent transducer circuitry. Voltage regulator 20 is also connected by a line 42 to adjustable current source 130 through an adjustable span resistor 44 which is connected to line 42 at one end and to line 161 at the other end.

An operational amplifier 131 forming part of current source 130 receives its power through lines 41 and 161. The inverting input of amplifier 131 is connected to the wiper of adjustable resistor 44 through a resistor 134. A line 135A connects the noninverting input of operational amplifier 131 between a resistor 135 and a resistor 136, which are equal in value and are in series across lines 41 and 160. Amplifier 131 outputs through a resistor 132 to the base of a transistor 133. A resistor 137 and a capacitor 138 provide the set current and filtering for operational amplifier 131. A resistor 139, which provides the set voltage to transistor 133, is connected to a line 41 at one end and to the emitter 141 of transistor 133 at its second end. Amplifier feedback resistor 140 is connected between resistor 139 and transistor 133 and is also connected to the inverting input of operational amplifier 131. The collector 142 of transistor 133 is connected by line 143 to sensor network 150 at junction 154A, between variable resistor 154 and resistor 151, thus providing the sensor network 150 with a current source for excitation and control.

In operation, modulator 100, AC amplifier 80, demodulator 70, and DC amplifier 60, detect an unbalance in the bridge circuit, and provide an input to current control 50 which provides a increase or decrease in current output which in turn produces a skewing voltage across feedback resistor 153 to rebalance the bridge. The increase or decrease in current from the output of the current control 50 passes through line 160, through DC power supply 10 and load resistor 11. The current change is also sensed at the inputs of the adjustable current source 130 (note the connection of resistors 135 and 136 between line 41 and line 160) and a portion of the input current to adjustable current source 130 corrects for the nonlinearity of sensor 158.

The oscillator 110 provides control pulses to modulator 100 and demodulator 70 through a line 111. Modulator 100, synchronously with the changing state of oscillator 110, provides to AC amplifier 80 a "sense" signal from one side of sensor network 150 (junction 151A) and then the other side of sensor network 150 (Junction 158A) through resistor 101 and resistor 102, respectively.

AC amplifier 80 is connected to the modulator 100 through coupling capacitor 81 which blocks direct current from modulator 100 to the base of a transistor 82. The collector of transistor 82 is connected through a second coupling capacitor 83 to the base of a transistor 84. The collector of transistor 84 is connected through a third coupling capacitor 85, and a resistor 86, to the input of demodulator 70. The collector of transistor 84 is also connected to line 41 through a resistor 87.

A resistor 88 is connected at one end between capacitor 81 and the base of transistor 82 and the second end of resistor 88 is connected to a capacitor 89 which is connected in parallel with series combination of a diode 90 and a resistor 91 to line 161. The emitter of transistor 82 is connected through a resistor 92 to line 161. The collector of transistor 82 is connected through a resistor 93 to line 41. The resistor 94 is connected at one end to the anode of diode 90 and at a second end to the base of transistor 84. The resistor 95 is connected at one end to emitter of transistor 84 and at a second end to a combination of capacitor 97 and a resistor 96 which connect to line 161. Transistor 82 and transistor 84 comprise a single ended two-stage amplifier. Transistor 82 and transistor 84 preferably are low noise devices with a relatively large, small signal forward gain ($h_{FE}$) at low collector current. By using a negative voltage feedback, the voltage gain of the transistors is essentially determined by the resistance of the load over the resistance of feedback $$\left( \frac{R_{Load}}{R_{feedback}} \right)$$

which is independent of the small signal forward gain. For transistor 82 the gain is approximated by:

$$\frac{\frac{R_{94} \times R_{93}}{R_{94} + R_{93}}}{R_{92}}$$

The negative feedback of transistors 82 and 84 reduces the effect of spikes generated by the switching of modulator 100. In operation, transistor 82 and transistor 84 are not allowed to stop conducting, hence, reducing radio frequency interference (RFI) which is caused by detection of the base to emitter junction of a transistor, which is herein eliminated.

DC amplifier 60 is connected to the inputs of demodulator 70 as explained, and demodulator 70 is also connected through resistor 61 to the inverting input of an amplifier 62, and through a resistor 69 to the noninverting input of amplifier 62. A capacitor 63 is connected between the inverting and noninverting inputs of amplifier 62. The noninverting input of amplifier 62 is also connected to the anode of diode 90 by a line 64. A capacitor 65 is connected from the output of amplifier 62 to the inverting input of amplifier 62; hence, providing AC feedback. Resistor 66 and capacitor 67 provide set current and filtering for amplifier 62. The output of amplifier 62 is connected through resistor 68 to the base of a transistor 51, which is the output and control element of current control 50. The collector of transistor 51 is connected to line 41 and the emitter is connected through a current limiting resistor 52 to line 161.

In operation, the current through the sensor network 150 is sensed by modulator 100. During each respective half cycle of oscillator 110, the voltage between junctions 158A and 153A and the voltage between 151A and 153A comprise the output of modulator 100 and these signals are amplified through AC amplifier 80. The amplified signals are then converted to DC signals at demodulator 70. The differential between the reference voltage between junctions 151A and 153A and the sensor voltage between junctions 158A and 153A is amplified in DC amplifier 60 and converted to a voltage representative of the differential values. This voltage is then converted to a current in current control 50.

A constant bias voltage is provided to the noninverting input of amplifier 62 through its connection to the anode of diode 90. The same bias voltage provided to the inverting input of amplifier 62 is provided through resistor 69, demodulator 70, and resistor 86 to capacitor 85, which is charged with the same potential as capacitor 63 during one half of the repetitive cycle of oscillator 110. On the next half cycle, the demodulator is triggered so that capacitor 85 discharges through resistor 86, demodulator 70, and resistor 61 to provide the stored offset voltage to the inverting input of amplifier 62. The signal on capacitor 85 is affected by the conduction of transistor 84. Based on the differential signal between the inverting and noninverting inputs to amplifier 62, amplifier 62 outputs a signal to the base of transistor 51 which proportionately adjusts the current through current control transistor 51. This current passes through resistor 52, line 161 and resistor 153 and through line 160 to DC source 10. The voltage change at resistor 153 caused by the changing current from transistor 51 tends to again balance the sensor network 150 by providing a skewing voltage to the sensor network as a function of the current from transistor 51. As the condition to be sensed changes, resulting in a change of resistance of resistor 158, the voltage across sensor 158 changes, again causing an unbalance in sensor network 150, which unbalance is again similarly processed. The current provided through resistor 153 and returned through DC power supply 10, also, flows through load resistor 11, line 12, diode 13, and voltage regulator 20, to line 41, hence completing the circuit. The current through load resistor 11 is representative of the condition to be sensed through sensor 158 in sensor network 150.

Linearity of the change in voltage sensed at modulator 100 with respect to temperature is achieved by employing a nonsymmetrical and nonlinear sensor network to compensate for any nonlinearity of the resistance vs. temperature curve of the sensor 158. The resistance vs. temperature curve for a platinum sensor, for example, is slightly nonlinear in a downward curving direction. In sensor network 150, resistor 151 and resistor 152 are a matched pair of resistors of equal resistance, and the resistance of each is much greater than (approximately 200 times) the combined resistances of sensor 158 and resistor 154. The correction for linearity in adjustable current source 130 is a function dependent on the change of sensor 158. The change in resistance of sensor 158 is a function of the change in temperature, and the change in resistance of sensor 158 in nonlinear with the change in temperature.

The resistance change in sensor 158 is detected and amplified through modulator 100, AC amplifier 80, demodulator 70, and DC amplifier 60 which results in an adjustment of output from the current control 50 which produces the skewing voltage across feedback resistor 153. The skewing voltage across resistor 153 results from the change in current from current control 50 which also changes the current $I_{out}$ in line 160. A small portion of $I_{out}$ is applied across resistor 135 and to the non-inverting input of operational amplifier 131, which results in a change in output of amplifier 131 and transistor 133, and thus a change in current $I_B$ to the sensor network. For each incremental change in the temperature of sensor 158 the offset correction provided to amplifier 131 substantially corrects for the non-linearity of sensor 158 by proper selection of resistor 139.

The equations which follow are of assistance in understanding the linearization function. Assuming that line resistances represented at 155, 156, and 157 are zero, and further assuming that resistor 151 and 152 are equal ($R_{151} = R_{152}$), the transfer function of the circuit can be written as:

$$I_{out} = \frac{[V_{(R139)} \times R_{151}][R_{158} + R_{153} - R_{154}]}{R_{153}[R_{139} \times R_{151} + R_{139} \times R_{154} + R_{154} \times R_{151} - R_{158} \times R_{151}]} \quad \text{Equation (1)}$$

Where:
$I_{out}$ = current in line 160
$V_{(R139)}$ = voltge across resistor 139
$R_{139}$ = resistance of resistor 139
$R_{151}$ = resistance of resistor 151
$R_{153}$ = resistance of resistor 153
$R_{154}$ = resistance of resistor 154
$R_{158}$ = base resistance of resistor 158

Equation (1) may be simplified by setting resistor 154 equal to the base resistance value of sensor 158. Assuming that resistor 139 is much greater than resistor 153 and assuming that resistor 151 is much greater than resistor 154 or sensor 158, one obtains:

$$I_{out} \sim \frac{[V_{(R139)} \times R_{151}][R_{153} + \Delta R_{158}]}{R_{151} \times R_{153}[R_{139} - \Delta R_{158}]} \quad \text{Equation(2A)}$$

$$I_{out} \sim \frac{V_{(R139)}[R_{153} + \Delta R_{158}]\left[1 - \dfrac{\Delta R_{158}}{R_{139}}\right]^{-1}}{R_{153} \times R_{139}} \quad \text{Equation (2B)}$$

Where $\Delta R_{158}$ is defined as the change in sensor 158 resistance: i.e., the resistance of the sensor 158 at temperature $T_1$ minus the base resistance of sensor 158 at the room or reference temperature, at which the output is at minimum. By expanding the equation (2B) one obtains:

$$I_{out} \sim \frac{V_{(R139)}[R_{153} + \Delta R_{158}]}{R_{153} \times R_{139}} \left(1 + \frac{\Delta R_{158}}{R_{139}} + \frac{\Delta R_{158}^2}{R_{139}^2} + \frac{\Delta R_{158}^3}{R_{139}^3} + \ldots \right). \quad \text{Equation (3A)}$$

$$I_{out} \sim \frac{V_{(R139)}}{R_{139}}\left(1 + \frac{\Delta R_{158}(R_{153} + R_{139})}{R_{153} \times R_{139}} + \frac{\Delta R_{158}^2(R_{153} + R_{139})}{R_{153} \times R_{139}^2} + \frac{R_{158}^3(R_{153} + R_{139})}{R_{153} \times R_{139}^3} + \dots\right). \quad \text{(Equation) (3B)}$$

Now using the assumption that $R_{139}$ is much greater than $R_{153}$ and setting $I_B$ equal to $V_{(R139)}$ one obtains:

$$I_{out} \sim I_B + \frac{I_B}{R_{153}}\left(\Delta R_{158} + \frac{\Delta R_{158}^2}{R_{139}} + \frac{\Delta R_{158}^3}{R_{139}^2} + \dots\right) \quad \text{Equation (3C)}$$

Equation (3C) demonstrates that sensor network 150 will compensate for second and higher order terms of $\Delta R_{158}$ as a function of the resistance of $R_{139}$ which results in $I_{out}$ being substantially linear with the sensed temperature. In other words, adjustable current source 130 is adjusted and compensates sensor network 150 as a function of $\Delta R_{158}$ with temperature, which is a nonlinear function.

Sensor network 150 is also designed to compensate for lead wire effect. Referring to FIGS. 1 and 2, the three lead wires connecting sensor resistor 158 to the network are represented by resistances 155, 156, and 157. Resistance 156 is in series with resistor 102, which may be 20,000 ohms, and also in series with the input impedance of transistor 82 which may be five Megohms. Since the resistance of the lead (line) represented by resistance 156 is of the order of a few ohms, the resistance 156 is not significant when compared with these two values. Adding the terms produced by $R_{155}$ and $R_{157}$ to equation (1) one obtains:

$$I_{out} = \frac{[V_{(R139)} \times R_{151}][R_{158} + R_{157} + R_{153} - R_{154} - R_{155}]}{R_{153}([R_{139}(R_{154} + R_{155})] + [R_{139} \times R_{151}] + R_{151}[R_{154} + R_{155} - R_{158} - R_{157}])} \quad \text{Equation (4)}$$

Simplifying by setting the value of lead resistance 155 equal to the value of lead resistance 157 and further simplifying by setting the base resistance of sensor 158 equal to the resistance of resistor 154 one obtains:

$$I_{out} \sim \frac{V_{(R139)} \times R_{151}}{R_{139}[R_{154} + R_{155} + R_{151}]} \quad \text{Equation (5)}$$

It can be observed from Equation (5) that since $R_{151}$ is much greater than $R_{154} + R_{155}$ (the lead resistance), the total lead wire resistance effect is very small. In the preferred embodiment $R_{151}$ is approximately 200 times $R_{154}$ and 20,000 times $R_{155}$. Hence, the effect of the lead wires (lines) represented by $R_{155}$, $R_{156}$, and $R_{157}$ is substantially compensated for.

What is claimed is:

1. A two wire transmitter having two terminals for connection to two wires from a series connected source of DC voltage and a load, the two wire transmitter comprising:

a voltage regulator means powered solely through said terminals to provide a stable output voltage;

a sensing circuit including sensor means which is variable as a known nonlinear function of a parameter for providing electrical signals as a function of variation of the sensor means;

a current source powered by said voltage regulator means solely through said terminals for providing an energizing current to energize said sensing circuit, said current source including linearizing impedance means having an impedance having a predetermined relationship to said known non-linear function, and wherein said energizing current flows through said linearizing impedance means;

means connected to said sensing circuit and coupled between said two terminals to adjust the current flowing through said two terminals as a function of the electrical signals from said sensing circuit;

means sensitive to the current flowing through said two terminals to provide a feedback signal to said sensing circuit to cause said electrical signals to tend to return to a known state; and means for adjusting the energizing current from said current source energizing said sensing circuit as a function of the current flowing through said two terminals to provide a linearizing effect on the relationship between the parameter sensed by the sensor means and the current flowing through said two terminals.

2. The combination as specified in claim 1 wherein said sensing circuit comprises a bridge circuit, the electrical signals provided by said bridge circuit having a first relationship at a known condition of the sensor means, and wherein said means connected to said sensing circuit adjust the current flowing through said two terminals in relation to changes in the electrical signals from said first relationship.

3. The combination as specified in claim 2 wherein said bridge circuit comprises a resistance bridge, and said sensor means comprises a resistance which varies with temperature.

4. The combination as specified in claim 2 wherein said means sensitive to current flowing through said two terminals includes a feedback resistance coupled to said bridge circuit to provide a feedback signal tending to return the electrical signals from said bridge circuit to the first relationship as the means connected to said sensing circuit adjusts the currents flowing through said two terminals, said feedback resistance being connected to be sensitive to total current passing through said two terminals.

5. The combination as specified in claim 2 wherein said bridge circuit comprises a four arm bridge having a pair of input junctions and a pair of output junctions, said current source being connected to one of said input connections, the other input junction being coupled to one of said terminals, a modulator having a pair of inputs connected to the output junctions, respectively, said four arms of said bridge comprising a first series connected pair of resistors between said input junctions, one of said output junctions being between said first pair of resistors, a second pair of resistors connected in parallel with said first pair of resistors and in series between said input junctions, one of said second pair of resistors comprising the sensor means, said first pair of resistors of said bridge being of a substantial order of magnitude larger than the resistances of said second pair of resistors.

6. The combination as specified in claim 5 wherein said sensor means is remotely located from the other portions of said bridge circuit, and means to connect said sensor means to said bridge circuit and into one input of said modulator comprising elongated lines, one of said elongated lines leading from said sensor means to the other resistor of the second pair of resistors, said other output junction of said bridge circuit being adjacent said sensor means, a other elongated line connecting the second output junction of said bridge to an input of said modulator, and a third elongated line connecting said sensor means to the other input junction of said bridge.

7. The combination as specified in claim 6 wherein said third elongated line connects said sensor means to the other input junction of said bridge through a feedback resistance, and a current return line connected to one of said terminals and connected to said third elongated line and through the feedback resistance to said other input junction.

8. The combination as specified in claim 5 wherein said means for adjusting the energizing current includes a control amplifier, said control amplifier having an input and providing an output as a function of a signal at its input, and means coupling said input of said control amplifier to said two terminals to provide a control signal to the current source which is a function of total current through said two terminals.

9. The combination of claim 8 wherein said voltage regulator means has a first power output and a power return line, said power return line being connected to one of the input junctions of said bridge, the second of said terminals carrying the total current being coupled to said bridge through a current return line, voltage divider means connected to said output line from said voltage regulator and to said current return line, the input of said amplifier being connected to said voltage divider means.

10. The combination as specified in claim 1 wherein the current source further includes a transistor connected in series with said linearizing impedance means for controlling said energizing current as a function of a control signal; wherein the means for adjusting the energizing current comprises amplifier means for providing the control signal to the transistor, the amplifier means receiving a first input signal which is a function of total current flowing through said two terminals; and wherein said linearizing impedance means controls the amount of energizing current conducted by said transistor in relation to the first input signal received by the amplifier means.

11. The combination as specified in claim 10 and further comprising span adjusting means for providing a second input signal to the amplifier means for adjusting the span of the total current; and wherein the amplifier means provides the control signal to the transistor as a function of a comparison of the first and second input signals.

12. A two wire transducer circuit comprising:
adjustable current source means including a linearizing impedance means and a controllable impedance means connected in series to provide an energizing current;
sensor network means connected to said adjustable current source means to receive the energizing current therefrom, said sensor network including sensor means to sense the value of a parameter to provide an unbalanced electrical signal in said sensor network means as a nonlinear function of the parameter to be sensed;
amplification means coupled to said sensor network means to sense the unbalanced electrical signal in said sensor network means;
current control means responsive to said amplification means for providing a feedback current to said sensor network means to correct for the sensed electrical unbalance; and
means to provide correction for the nonlinear function of the unbalanced electrical signal relative to the value of the parameter to be sensed, said correction means being connected to said adjustable current source means to change the energizing current flowing through the linearizing impedance means and the controllable impedance means as a function of the feedback current.

13. The combination as specified in claim 12 wherein the means to provide correction includes amplifier means for receiving an input signal which is the function of the feedback current and a reference signal and providing a control signal to the controllable impedance means of said adjustable current source means.

14. The combination as specified in claim 13 and further comprising span adjusting means for providing the reference signal to the amplifier means, the span adjusting means permitting adjustment of the reference signal to thereby adjust output span of the two wire transducer circuit.

15. The combination as specified in claim 13 wherein the controllable impedance means comprises a transistor and wherein the linearizing impedance means comprises a linearizing resistor, and wherein said linearizing resistor controls the amount of energizing current conducted by said transistor in relation to the input signal received by the amplifier means.

16. A two wire transmitter having two terminals for connection to two wires from a series connected source of DC voltage and a load, the two wire transmitter comprising:
a voltage regulator means powered solely through said terminals to provide a stable output voltage;
a sensing circuit including sensor means which is variable as a known nonlinear function of a parameter for providing an electrical signal as a function of variation of the sensor means;
a current source powered by said voltage regulator means for providing an energizing current to energize said sensing circuit, said current source including linearizing impedance and having an impedance having a predetermined relationship to said known non-linear function, and wherein said energizing current flows through said linearizing impedance means;
means connected to said sensing circuit and coupled between said two terminals to adjust the current flowing through said two terminals as a function of said electrical signal from said sensing circuit;
means for providing a first input signal which is a function of said electrical signal provided by the sensing circuit;
span adjusting means for providing a second input signal which is independent of said electrical signal, said second input signal being adjustable for different desired spans; and
means for adjusting the energizing current from said current source energizing said sensing circuit as a function of the first and second input signals to provide a linearizing effect on the relationship between the parameter sensed by the sensor means and the current flowing through said two terminals.

17. The combination as specified in claim 16 and further comprising:
   means sensitive to the current flowing through said two terminals to provide a feedback signal to said sensing circuit to cause said electrical signal to tend to return to a known state; and
   wherein said second input signal is also independent of said feedback signal.

18. The combination as specified in claim 17 wherein said first input signal is a function of the current flowing through said two terminals.

19. A two wire transducer circuit comprising:
   adjustable current source means including a linearizing impedance means and a controllable impedance means connected in series to provide an energizing current;
   sensor network means connected to said adjustable current source means to receive the energizing current therefrom, said sensor network including sensor means to sense the value of a parameter to provide an unbalanced electrical signal in said sensor network means as a nonlinear function of the parameter to be sensed;
   means for providing an input signal which is a function of said unbalanced electrical signal;
   span adjusting means for providing a span reference signal which is independent of said unbalanced electrical signal, the span adjusting means permitting adjustment of the span reference signal to thereby adjust output span of the two wire transducer circuit; and
   means to provide correction for the nonlinear function of the unbalanced electrical signal relative to the value of the parameter to be sensed, said correction means being connected to said adjustable current source means to change the energizing current flowing through the linearizing impedance means and the controllable impedance means as a function of the input signal and the span reference signal.

20. The combination as specified in claim 19 and further comprising:
   means for providing a feedback current to said sensor network means to correct for the unbalanced electrical signal; and
   wherein the span reference signal is independent of said feedback current.

21. The combination as specified in claim 20 wherein said input signal is a function of said feedback current.

22. The combination of claim 21 wherein said sensor means is a resistance-type sensor and said linearization impedance means is a linearization resistor.

* * * * *

UNITED STATES PATENT OFFICE
CERTIFICATE OF CORRECTION

Patent No. 4,205,327      Dated May 27, 1980

Inventor(s) Charles J. Dahlke

It is certified that error appears in the above-identified patent and that said Letters Patent are hereby corrected as shown below:

Column 6, line 7, "in" (first occurrence) should be --is--. Column 7, line 7, "$V(R139)$" should be --$\frac{V(R139)}{R_{139}}$--. Column 8, line 46, (Claim 4, line 7), "currents" should be --current--. Column 9, line 7, (Claim 6, line 9), change "other" to --second--; Column 9, line 8, (Claim 6, line 10), change "second" to --other--.

Signed and Sealed this

Twenty-eighth Day of October 1980

[SEAL]

Attest:

SIDNEY A. DIAMOND

Attesting Officer     Commissioner of Patents and Trademarks